United States Patent [19]
Willis et al.

[11] Patent Number: 5,938,833
[45] Date of Patent: Aug. 17, 1999

[54] CHEMICAL PROCESS FOR FRACTIONATING MINERAL PARTICLES BASED ON PARTICLE SIZE

[75] Inventors: Mitchell J. Willis, Macon, Ga.; Sanjay Behl, Fontainebleau, France; Raymond H. Young, Macon, Ga.

[73] Assignee: Engelhard Corporation, Iselin, N.J.

[21] Appl. No.: 08/891,666

[22] Filed: Jul. 11, 1997

Related U.S. Application Data

[63] Continuation-in-part of application No. 08/716,514, Sep. 18, 1996, abandoned.

[51] Int. Cl.[6] .............................. C09C 1/42; B03B 1/00
[52] U.S. Cl. .................... 106/487; 106/416; 106/486; 106/488; 501/146; 209/5; 209/10; 209/172
[58] Field of Search .................... 501/146; 106/416, 106/487, 486, 488; 209/5, 10, 172; 162/181.8; 428/537.5

[56] References Cited

U.S. PATENT DOCUMENTS

| | | | |
|---|---|---|---|
| 2,569,680 | 10/1951 | Leek | 209/10 |
| 2,990,958 | 7/1961 | Greene et al. | 209/166 |
| 3,701,417 | 10/1972 | Mercade | 209/5 |
| 3,837,482 | 9/1974 | Sheridan, III | 209/5 |
| 3,862,027 | 1/1975 | Mercade | 209/5 |
| 4,334,985 | 6/1982 | Turner, Jr. | 209/5 |
| 5,535,890 | 7/1996 | Behl et al. | 209/5 |
| 5,584,394 | 12/1996 | Behl et al. | 106/486 |
| 5,603,411 | 2/1997 | Williams et al. | 209/5 |
| 5,645,635 | 7/1997 | Behl et al. | 106/486 |

FOREIGN PATENT DOCUMENTS

| | | | |
|---|---|---|---|
| WO 96/17688 | 6/1996 | WIPO | B03D 3/06 |
| WO 96/28516 | 9/1996 | WIPO | C09C 1/42 |
| WO 97/27944 | 8/1997 | WIPO | B03D 3/06 |

*Primary Examiner*—Michael Marcheschi
*Attorney, Agent, or Firm*—I. L. Moselle; T. J. Shatynski

[57] ABSTRACT

This invention pertains to the use of a combination of polyvalent cations, clay dispersant and high molecular weight anionic polymer to preferentially remove colloidal fines (slimes) from a kaolin slurry, leaving the remainder of the kaolin in the slurry in the form of a coherent gelatinous mass.

11 Claims, 1 Drawing Sheet

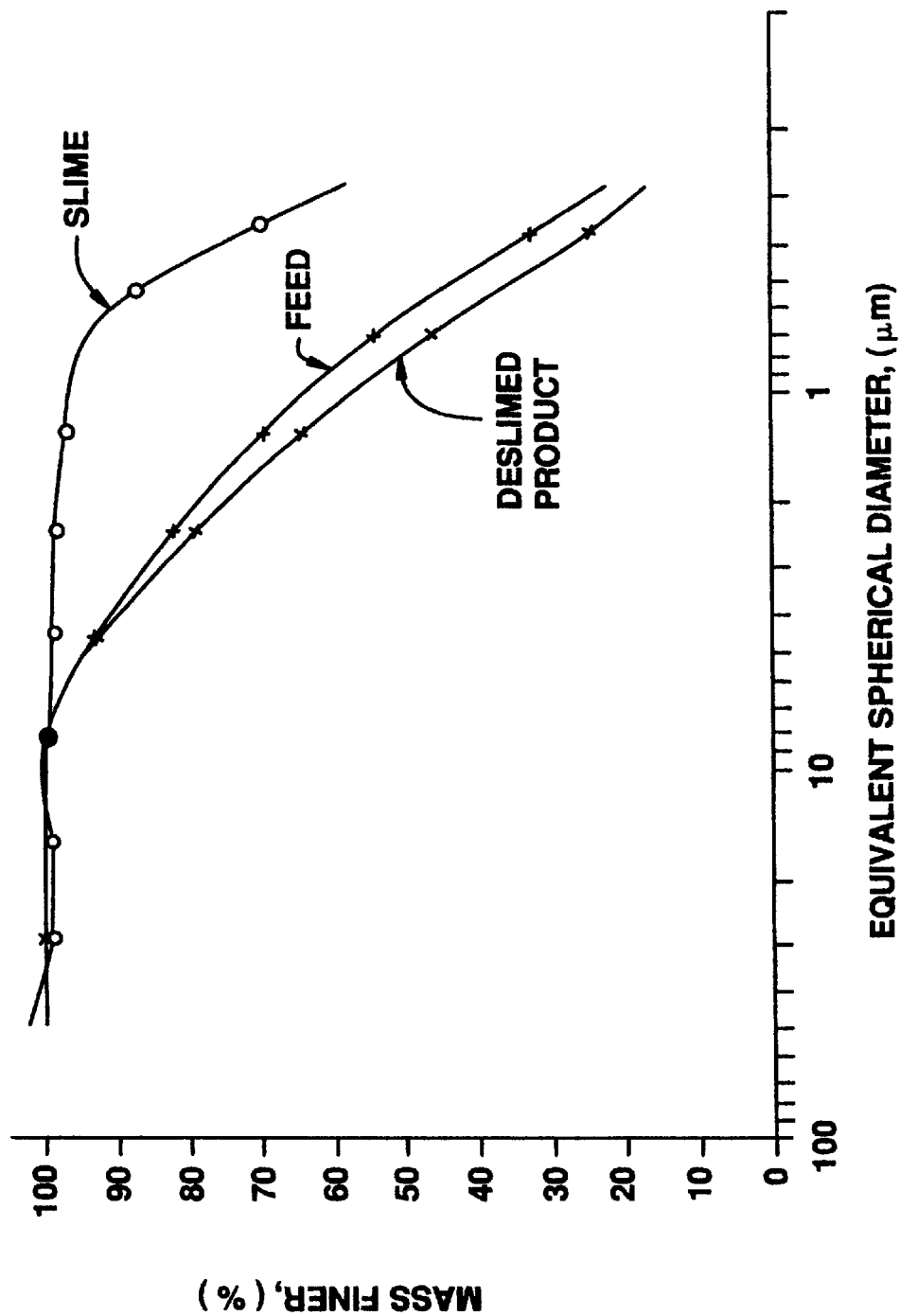

CHEMICAL PROCESS FOR FRACTIONATING MINERAL PARTICLES BASED ON PARTICLE SIZE

RELATED APPLICATION

This is a continuation-in-part of U.S. Ser. No. 08/716,514, filed Sep. 18, 1996 abandoned.

FIELD OF THE INVENTION

This invention relates to a novel process for selectively removing slimed (colloidal) particles in an industrial mineral, especially kaolin clay, from larger particles by chemical means. The processing effects the selective flocculation and sedimentation of the coarser particles from a dispersed aqueous pulp into a coherent gelled lower layer which is a concentrate of deslimed particles and an upper dispersed layer which is a dilute concentrate of the slimed particles. When applied to processing kaolin clay, the gelled lower layer is readily dispersed to produce a useful deslimed kaolin clay product having a desirable narrower particle size distribution than the starting clay as a result of desliming.

In particular, the invention relates to the use of the combination of controlled amounts of a high molecular weight, high charge density anionic polymeric flocculating agent, polyvalent cations, an anionic clay dispersant, and pH control, to effect the removal of slimes as a dilute fluid supernatant layer from the lower gelled layer containing the deslimed particles.

BACKGROUND OF THE INVENTION

Kaolin clay is a widely used industrial mineral. The clay occurs as an ore from which grit must be removed for virtually all end uses of the clay. The resulting degritted crude kaolin is composed largely of kaolin particles that usually have a wide range of sizes ranging from slimes (finer than 0.3 microns) up to about 10 microns. Frequently discrete mineral impurities such as titania, various ferruginous minerals, mica and nonkaolinitic clays such as bentonite and attapulgite, are present. Such nonkaolin minerals can be removed at least partially by means such as froth flotation, selective flocculation, magnetic separation, bleaching and combination of such steps. The purified kaolin particles are polydisperse, i.e., the size of the particles represent a wide range of sizes. For example, a kaolin that is 100% by weight finer than 2 microns, may contain kaolin particles ranging in size from submicron through 2 microns.

Most uses of purified kaolin require stringent control of the size of the kaolin particles. For example, a #2 coating clay must be about 80% by weight finer than 2 microns. A #1 coating clay must be about 90% by weight finer than 2 microns. A high glossing (#0) grade is nearly 100% by weight finer than 2 micron. Particle size distribution is also controlled for many commercial uses. Thus, two clays may be #1 coating clays as defined by the minus 2 micron parameter. However, a #1 grade with a narrow particle size distribution will generally provide greater opacity and gloss than a #1 grade with a broad particle size distribution. Narrowing of particle size distribution can be achieved by fractionation to reduce oversize and/or desliming to reduce undersize.

Conventional centrifuges, such as Bird solid bowl machines, are widely used to fractionate kaolins. Typically, such centrifuges operate at "g" forces of about 800–1200. Centrifuges that apply greater "g" forces than the Bird machines are needed to produce deslimed kaolins. An examples of a high speed centrifuge is a horizontal three-phase centrifuge, such as one commercially available from Alfa Laval Co. (Greenwood, Ind.). Such centrifuges can be operated in the range of about 1,000 to 10,000 "g" forces, preferably in the range of about 1500–3000. A "g" force of about 5000 is typical. These high speed centrifuges can effect a sharp separation of kaolin particles finer than about 0.3 microns from larger kaolin particles. However, the capital and operating costs are high. Also, these centrifuges are subject to excess wear, especially wear of the nozzles, necessitating frequent repair or replacement.

Most uses of kaolin mineral particles require that the kaolin particles be dispersed or dispersible in water. This is true whether the kaolin particles are intended for use as an intermediate in one or more beneficiation schemes or whether the kaolin particles are intended for a commercial end-use, such as paper coating. Nondispersible kaolin products or by-products have limited commercial value.

It has long been the practice of the industry to fractionate kaolin into kaolin particles of one size range from kaolin particles having a different size prior to and/or subsequent to certain beneficiation treatments carried out with dispersed aqueous pulps. For example, the flotation beneficiation process known as ULTRAFLOTATION requires the use of a fraction of kaolin that is finer than typical degritted kaolin crudes of the type frequently referred to as "coarse" or "soft" crudes. See U.S. Pat. No. 2,990,958. Conventional (Bird) centrifuges can operate effectively to produce typical #1 and #2 fractions as a step prior to carrying out this beneficiation process. On the other hand, some processes practiced in the kaolin industry require or are improved by removing slimes before or after carrying out the unit operation. An example is the use of mechanical means to remove slimes before or after delamination. Reference is made to copending application, U.S. Ser. No. 08/384,973, filed Feb. 7, 1995, (and refiled as U.S. Ser. No. 08/677,758), entitled "DELAMINATED KAOLIN PIGMENT, THEIR PREPARATION AND USE", Behl, et al. When true desliming, i.e., removal of essentially all slimed particles is required, the use of centrifuges operated at very high "g" values was necessary in the past.

In contrast to mechanical systems employed in minerals processing industries to effect separations based on differences in mineral species or size, chemical means are also used in processing industrial minerals. Froth flotation, referred to above, is an example of a chemical system. In selective flocculation, charged inorganic or organic molecules are used to selectively flocculate minerals from each other based on difference in mineral species. This is fundamentally different from separating minerals of one species from minerals of the same species, e.g., the separation of fine kaolin particles from coarser kaolin particles.

A recent example of the use of selective flocculation to separate minerals based on differences in species is U.S. Pat. No. 5,535,890, Behl, et al. This patent relates to a flocculation process especially useful in separating colored mineral impurities, especially titania, from kaolin particles. The processing includes the use of a dispersant to provide a fluid pulp, conventional kaolin froth flotation reagents such as oleic acid, a source of calcium ion, and a high molecular weight anionic polymeric flocculating agent. The impurities settle as a lower flocculated layer from an alkaline pulp and the purified kaolin is recovered as a dispersed fluid suspension which is separated from the sedimented impurities by decantation.

Organic polymers have also been proposed to achieve selective flocculation of kaolins into dispersed and flocculated fractions differing in viscosity. An early example is U.S. Pat. No. 2,569,680, Leek, which utilizes the difference in surface chemistry between some kaolin particles and other kaolin particles giving rise to high viscosity. A more recent example is U.S. Pat. No. 4,334,985 Turner, et al. Turner, et al., seek to remove small amounts of coarse aggregates of kaolin from kaolin particles to improve the viscosity of the remaining kaolin. The processing uses an anionic organic polymer to bring about separations comparable to those achievable with conventional (e.g., Bird) centrifuge. Thus, coarse aggregate are removed as a sediment from a kaolin material and the remaining kaolin, the desired product is recovered as a dispersed slip. Turner, et al., do not fractionate a kaolin into a slimed and nonslimed fractions such as is accomplished using an Alfa Laval separator as the dispersed phase material. Rheology data, in the patent indicate that the flocculated aggregates are not readily dispersible.

All particle sizes referred to herein are determined by a conventional sedimentation technique using a SEDIGRAPH® 5100 analyzer analysis. The sizes, in microns, are reported as "e.s.d." (equivalent spherical diameter).

IN THE DRAWINGS

The accompanying FIGURE contains particle size distribution curves for a feed kaolin and the fine and coarse fractions obtained by practice of this invention. The distribution is expressed, in conventional manner, as a weight percentage.

SUMMARY OF THE INVENTION

The present invention comprises a process for selectively removing slimed particles, especially slimed, kaolin particles (for example, particles finer than 0.3 micron) from larger kaolin (for example, particles in the range of 0.3 to 5 microns) in a manner such that the resulting deslimed particles are easily dispersible in water using conventional dispersion chemicals and equipment. The processing includes the use of controlled amounts of at least one anionic dispersant, polyvalent cations, a high molecular weight, anionic polymeric flocculating agent and a pH of at least 7 and below 10.

In the case of kaolin, the processing results in the separate recovery of two different size fractions of kaolin, one of which (the slimes) are recovered as a dilute suspended dispersed phase and the other, normally the product of principal value, is recovered as a coherent gelatinous bottom layer. Upon decanting the supernatant upper layer from the coherent gelatinous bottom layer, a deslimed kaolin product is obtained without using a high speed centrifuge to effect the separation. A unique and valuable aspect of the processing is that the gelatinous layer, although composed of a tenacious network of flocs, is readily dispersed, whereby the deslimed kaolin is useful for commercial applications of high grade kaolins, especially kaolins having a narrow particle size distribution as a result of the removal of slimes. The slimed fraction can be blended with hydrous grades of kaolin or it can be used as calciner feed to make metakaolin or fully calcined kaolin pigments.

In practice of the invention, a high recovery of deslimed but dispersible kaolin can be obtained at an extremely low operating cost. This result is obviously not achievable by the Turner et al.

Another aspect of the invention relates to novel deslimed kaolin pigment products obtained by practice of the invention.

Kaolin pigments of the invention are especially useful for providing the combination of opacification and gloss when coated on paper. The pigments have an average particle size in the range of 0.5 to 5 micron, usually 0.5 o 1.5 micron and a narrow particle size distribution such that the ratio of the weight of the fraction of particles finer than 2 microns divided by the weight of the fraction of particles finer than 0.3 microns is greater than 4.0, preferably greater than 4.5. The pigments contain residual anionic polymer from the fractionation process in amount in the range of 50 to 500 ppm and, when calcium is the polyvalent cation, contain from 0.025% to 0.1% by weight calcium, expressed as CaO, based on the dry weight of the pigment.

DESCRIPTION OF PREFERRED EMBODIMENT

The invention will be described in connection with the processing of kaolin clays. Clay dispersants useful in practice of the invention include sodium polyacrylate, sodium condensed phosphate, sodium silicate, alum silicate hydrosols, soda ash and combinations thereof, as well as combinations thereof with sodium hydroxide.

In practicing the invention using flotation beneficiated kaolins which already have a suitably high calcium ion concentration as a result of addition of a calcite carrier, increments of dispersant are added using conventional "laddering" techniques known in the industry to determine an optimum dispersant concentration. When applying the process to nonfloated clays, it is preferable to add dispersant and thereafter add a source of calcium at a fixed level, for example, 2# $CaCl_2$ per dry ton clay. The dispersant level is optimized and then the calcium level is optimized.

In one preferred embodiment of the invention, using feed clay that is about 80% by weight finer than 2 microns, at least 60% by weight of the slimed kaolin charged to the process is recovered as a deslimed product in the lower gelatinous layer. Preferably, recovery of deslimed product is at least 80%, most preferably 90% or higher.

In another embodiment, the feed is about 90% or more finer than 2 microns and the recovery of deslimed product is lower than when using coarser feed clay; thus recovery of slimed material is higher. For example, 60% by weight of feed may be converted to deslimed product and 40% by weight slimed co-product useful as calciner feed.

To produce strong flocs that are readily dispersible reagent control is required. As mentioned, polyvalent (e.g., $Ca^{++}$) concentration in the aqueous phase should be at least about 5 ppm. At least 0.025% by weight of polymer, based on the dry weight of the clay should be added. The pH should be less than 10 and greater than 7. The polymer should contain both amide and acid groups, the acid groups predominating.

To maximize the recovery of deslimed kaolin without significantly changing the coarse end of the particle size distribution curve, polymer should be added in 0.005% increments until the selectivity of the particle separation is observed by the yield of particles in the gelatinous phase reaching a maximum. Additionally, when the surface charges and number of counterions are optimized the molecular weight of the polymer can be varied to shift the degree of slime particle mass removed to meet manufacturing requirements.

The invention is useful in fractionating kaolin particles obtained by degritting coarse and fine particle size crude ores or processing streams obtained from such crudes or mixtures thereof. Unlike prior art processes using polymers to divide kaolin into fraction, such as the process of Turner, et al., our process is not limited to the use of high viscosity crudes but operates with high and low viscosity kaolin crudes.

In practice of the invention, kaolin clay composed of a range of particle sizes is formed,into a well dispersed, fluid aqueous pulp by adding at least one anionic dispersant, such as a sodium silicate, condensed phosphate salt such as sodium hexametaphosphate, soda ash, a water soluble acrylate salt polymer having a molecular weight in the range of 1000 to 5,000, or alum silicate hydrosol. Sodium hydroxide may be added for Ph control. The dispersant is used in amount sufficient to form a fluid pulp.

Preferably, the zeta potential of the dispersed pulp is such that it is essentially constant (does not vary by more than about 5 millivolts) when increments of dispersant are added. It may be necessary to add additional dispersant when using as feed clay, a stream that is optimally dispersed for a particular unit operation, such as magnetic separation. Typically, zeta potential is in the range of −25 to −50 millivolts, usually −30 to −45 millivolts, and most usually −35 to −45 millivolts.

Generally the Brookfield viscosity (as measured using a No. 2 spindle at 20 rpm) is less than 600 centipoises, typically is in the range of 20 to 50 cp for a 40% solid pulp. The quantity of dispersant needed to form a fluid pulp will vary with the type of kaolin, the solids and the species of dispersant. An excess of dispersant could flocculate the pulp; this is avoided.

To the well dispersed aqueous pulp there is added a source of multivalent cations, preferably divalent cations, most preferably calcium ions, unless the pulp already contains a sufficiently high concentration of polyvalent cations; the concentration of calcium ions in the solution phase (before the addition of polymer) should be at least 5 ppm and up to about 30 ppm, and is preferably 6 to 25 ppm. Most of the calcium reports with the flocculated kaolin. In the case of calcium chloride, the preferred source of polyvalent cations, the quantity of such salt is generally in the range of 1 to 4 pounds per ton of dry clay, preferably 2 to 2.5 pounds per ton of dry clay. Zero (0) pounds per ton is suggested for use with clays previously beneficiated with a calcite carrier.

A high molecular weight, high charge density anionic acrylic acid polymer or acrylic acid/acrylamide polymer is added to the pulp with mixing. The resulting pulp is typically at a clay solids content of about 20% to 25% (weight). The pulp, after dilution with polymer solution, is allowed to settle until it separates into a lower flocculated gelatinous layer and an upper dilute suspended layer. Typically, the gelatinous layer contains a coarser fraction of kaolin particles having an average size above 0.5 microns and is at about 35% solids. The dispersed suspended layer of finer kaolin particles typically has an average size below 0.5 micron, preferably below 0.3 microns, for example 80% by weight finer than 0.5 micron and is typically at 3–10% solids. The flocculated layer and the dispersed layers are separately recovered. Removal of the supernatant dispersed layer from the gelatinous layer is by decantation. Filtration is not a suitable means for effecting the separation.

The flocculating polymer used in the process is highly anionic and is a homopolymer or co-polymer of carboxylic acid, carboxylic anhydride and carboxylic acid salt monomer with a suitable non-ionic monomer. Examples of a non-ionic monomers are carboxylic acid amide and carboxyl alkyl esters. A co-polymer of acrylic acid (or salt thereof) and acrylamide is preferred for kaolin processing. Since the polymer is highly anionic, it consists predominately of the acid acrylic group. Recommended is a polymer in which the ratio of acid acrylic group to amide group is about 80/20.

Typically, the molecular weight of the highly anionic polymer is at least 1 million, preferably at least 5 million, and most preferably in the range of 10 million or higher. The quantity of the high molecular weight polymer is typically in the range of 0.1 to 1.0 #/ton of kaolin (based on the dry weight of the kaolin). The term "molecular weight" as used herein, refers to the weight average molecular weight as measured using the mark HOUWINK™ equation which uses intrinsic viscosity versus molecular weight relationships in a capillary instrument.

Polymers used in the accompanying examples were obtained from Sharpe Specialty Chemical Co. and included SHARPFLOC™ flocculating polymer 9990, 9993, 9950, 9954 and 8581. The method of production of these polymers is proprietary. In theory they can be prepared by either co-polymerization of acrylamide and acrylic acid (anionic monomer) or by partial hydrolysis of polyacrylamide.

The anionic polymeric flocculating agent is different from a low molecular weight anionic polymer which may be used as a dispersant or as a component of the dispersant. Dispersant grades are suitably sodium or ammonium polyacrylate salts having a molecular weight below 20,000, preferably in the range of 1000 to 8000, and most preferably in the range of 3000 to 5000.

The quantity of dispersant, which, as mentioned can be any conventional anionic clay dispersant, may be used to control the amount of minus 0.3 micron particles that are removed from the coarser kaolin particles. Preferably, maximum selective removal of slimes is desired. The high molecular weight polymer, on the other hand, may be used to control the recovery of the coarser fraction. Thus, a desired degree of desliming can be achieved by adjusting the relative proportions of dispersant and flocculating agent and recovery of deslimed kaolin can be maximized by controlling the proportions of these materials.

In one preferred embodiment of this invention, the chemically deslimed clay (flocculated phase) is dispersed and subsequently used as feed to a delaminator to produce a glossing, coating clay, as described in copending U.S. Ser. No. 08/677,758. The starting clay is suitably approximately 70% by weight (e.g., 65–75%) finer than 2 microns and about 25–30% by weight finer than 0.3 microns. Chemical desliming, in accordance with this invention results in a flocculated (coarse fraction) that has about the same weight percentage of particles finer than 2 microns as the starting feed (i.e., 70% finer than 2 microns for a crude that is 70% finer than 2 microns) but contains only from 0 to less than 20% by weight of particles finer than 0.3 microns. Thus, desliming can be selective in that it does not change the coarse end of the particle size distribution curve more than 5%. This means that there are essentially no losses of kaolin particles in the desirable particle size range. The slimes remain dispersed and may be discarded or used as a blend component in standard processing. The flocculated kaolin is then dispersed using conventional clay dispersants and low shear equipment such as blungers.

In a second preferred embodiment, an ultrafine clay such as a Tertiary clay, also referred to as "hard" kaolin, is used as feed to the chemical desliming treatment of the invention. Optionally, the product is calcined or converted to a cationically bulked hydrous kaolin coating pigment. The kaolin crude is typically about 90% by weight (e.g., 85–95% by weight) finer than 2 microns and contains about 30% by weight or more of particles finer than 0.3 microns. Average particle size is generally in the range of 0.4 to 0.5μ. Significant amounts of the particles smaller than 0.3 microns are separated as a suspended layer during the chemical desliming treatment. The flocculated deslimed material is typically 90% finer than 2 microns and usually is free from particles finer than 0.3 microns. In some cases the chemically deslimed kaolin can contain up to about 20% by weight of particles finer than 0.3 microns.

The chemical desliming treatment of the invention can be applied to various other processing streams in a kaolin plant. For example, the treatment can be applied to a dispersed beneficiated kaolin product obtained from a flotation plant or it can be applied to dispersed kaolin purified by selective flocculation.

Frequently, sodium silicate or sodium silicate/alum hydrosols are used as a primary dispersant in producing product streams subsequently processed by the method of this invention. The pH of such kaolin streams are frequently in the range of 5 to 7. After addition of sodium metasilicate or other dispersant such as sodium hexametaphosphate, or sodium or ammonium polyacrylate the pH of the slurry should be at least 7 but below 10. After addition of primary dispersant and secondary dispersant, the dispersed kaolin pulp is a thin fluid having the appearance of a milkshake. When maintained quiescent, essentially no stratification or appearance of flocs takes place. The slurry is dispersed in the sense that particles are not aggregated. The degree of dispersion may not be the same as that of a slurry dispersed to minimum viscosity. We prefer to disperse the pulp using a quantity of dispersant such that when zeta potential is measured in conventional manner and a zeta potential curve is drawn, the curve is substantially flat.

The salt containing a polyvalent metal cation is added to the pulp simultaneously with or immediately after the addition of the secondary dispersant. When treating a kaolin material which provides a sufficiently high concentration polyvalent cations in pulp, it may not be necessary to add any other source of polyvalent cations. Suitable salts containing polyvalent metal cations are soluble in water at the pH of the pulp to which the salt is added. Especially preferred are salts containing divalent metal cations, particularly calcium and magnesium. Other polyvalent metal cations that may be used include aluminum, ferric, tin, titanium, manganese and rare earth. The preferred anion of the salt is chloride, although nitrate, acetate or formate salts may be used. The salt is added dry or as an aqueous solution; salt is added in the amount generally in the range of about 0 to 4 pounds/ton, most preferably about 2 pounds per ton of dry clay. Sufficient $Ca^{++}$ concentration results in an aqueous phase (after settling of the gelled layer) containing at least about 5 ppm $Ca^{++}$. When excess salt is used, undesired nonselective flocculation of the pulp may occur and this may interfere with the ability of the polymer to flocculate the kaolin selectively, based on particle size. When no salt is added, the flocs formed are very small and this would adversely affect the separation process.

The dispersed pulp is typically at 10 to 50 percent solids prior to addition of high molecular weight polymer. Minimal dilution occurs when these reagents are added, whereby the solids of the pulp may remain essentially unchanged. The pH of the slurry typically ranges from 7 to 8.5 after addition of all reagents.

The high molecular weight polymers are subject to degradation when aged. In a 0.3% concentration they are stable for several days. The shelf like of 0.025% is about one day, sometimes onehalf day, due to temperature. Additionally, to achieve optimum "uncoiling" of the polymer concentrations in the range of 0.025% provide an optimum configuration for attachment to the clay surface. At very low concentrations, the volume of water added becomes too large, thereby causing handling problems and undesirable hydrolysis of the polymer. In making up the polymer solution, water with a low content of calcium and magnesium is recommended. Agitation should be sufficiently moderate to avoid degradation of the polymer while it is being solubilized in water. At higher concentrations, the flocculated material may aggregate due to mixing limitations.

Virtually immediately after the solution of the high molecular weight polymer is added to the well dispersed pulp preconditioned with metal salt, the formation of a lower gelatinous layer can be observed. It is preferable not to agitate the contents of the vessel in order for layering to take place. However, agitation, even severe, will not impair floc formation. Within a few minutes of standing under quiescent or semi-quiescent conditions, the floc settles as a well-defined viscous gelatinous bottom layer, which tends generally has the same color as the suspended layer. However, the suspended layer is semi-transparent; the lower layer is homogeneous and opaque. In case of East Georgia kaolin, the iron content of the clay remains essentially unchanged. However, in the case of kaolins containing liberated iron and titanium minerals, the iron and titanium may concentrate in the gelatinous layer. Thus, the use of kaolin pretreated by means such as froth flotation, or selective flocculation to remove colored impurities is desirable when producing kaolin pigments requiring high brightness. Unless the clay has been degritted before treatment, grit will report in the flocced layer when processing kaolin crude. Thus, the clays undergoing treatment should be degritted. Most of the water in the pulp appears in the supernatant slime-rich upper layer.

After polymer addition, a fluid dispersion of the slimed matter can be decanted in a cone bottom classifer, a cylindrical tank, column, etc., with the underflow containing the gelatinous mass containing the desired coarser particles. Mechanical devices such as a drag box or a low shear centrifugal device, may also be used to separate the flocs from the dispersed product. Use of such devices are included in the term "decantation" as employed herein.

Processing downstream of decantation can provide numerous opportunities to optimize the overall process yield and decrease the amount of residual impurities which remain in the dispersed phase.

The flocs are agitated with the addition of standard kaolin dispersants, typically using from 1 to 6 #/ton of dispersant (dry basis). This tends to break the floc structure and the slurry becomes workable. In plant practice, this step may be achieved by using standard centrifugal pumps.

While the invention has been described in connection with its use in processing kaolins, other minerals capable of being dispersed and flocculated with anionic materials may also be treated. Examples are calcium carbonate minerals such as calcite, limestones, titania (rutile) minerals and the like. Kaolin pigments of the invention can be calcined to provide high brightness calcined kaolin products useful as coating pigments for paper or fillers for paints, plastics, rubber and the like.

Examples illustrating the effectiveness of the technology on crude clays and in-process streams are described below.

EXAMPLE 1

The process feed clay was previously beneficiated in a commercial flotation plant. The feed clay to the flotation plant was obtained by blunging a Georgia kaolin crude with a hydrosol dispersant, degritting and fractionation by a known manner in a Bird Centrifuge to obtain a #2 fraction (70–80% <2 um) as the overflow. The #2 fraction was beneficiated by ULTRAFLOTATION using a calcite carrier substantially as described in U.S. Pat. No. 2,990,958 (Greene, et al.)

The beneficiated #2 fraction from the flotation process had a pH value of 8.6 and a solids content of 21.8% by weight. The product slurry was then subjected to an ozone treatment to decolorize residual flotation reagents. This ozonated slurry with a pH value of 8.1, represents the control sample for the following tests carried out at this pH. A portion of the ozonated slurry was treated with caustic to increase the pH value to 10.3 to act as the control sample for the higher pH tests.

The following dispersants were added at the disclosed levels:

1. Sodium polyacrylate, supplied by Rhone Poulenc Corp. with a designation of C-211, was added at a level of 0.25#/ton clay on a dry/dry basis.

2. Sodium hexametaphosphate (SHMP) was added at 0.75#/ton on a dry/dry basis.

3. Sodium Metasilicate (MS) was added at 0.25#/ton clay on a dry/dry basis.

To a portion of the high pH control slurry, the following was added:

1. Sodium hexametaphosphate at 0.25#/ton

2. Sodium polyacrylate at 0.1#/ton, both added on a dry/dry basis.

The following measurements were performed on each sample before the addition of the flocculating reagent:

1. Slurry pH

2. Zeta potential using a PEN Kem Lazer Zee Meter Model 501

3. Concentration of calcium ion in the aqueous layer using the conventional ICP method.

While each of the samples, including the controls, was being stirred, there was added 0.3#/ton of clay (dry/dry basis) of the flocculating polymer, SHARPFLOC flocculating polymer 9950. This polymer has a molecular weight of 10 million and a ratio (mole) of polyacrylic acid/polyacrylamide of 80/20.

The concentration of the polymer solution was 0.025%. The stirring of samples was stopped and allowed to settle at a at the rate of 30 seconds/inch-depth of slurry. The non-flocculated supernatant, or slimes, was decanted from the flocculated mass. Soluble calcium concentration of the slimes was 2.6 ppm; soluble calcium concentration of the flocculated mass was 18.3 ppm.

The relative strength, or "redispersion characteristics" of the flocculated layer was measured by a stress sweep on a Bohlin Rheometer, model CS 50, in oscillatory mode. The critical stresses are reported at angular frequencies of 0.1 Hz. and 1.0 Hz. These measurements were made to identify any potential differences in the flocculated mass structure and energy requirements to redisperse. The oscillatory rheological measurements provide an important insight into the structure of the flocculated masses. The critical stress values relate to the strength of the floc structure which, in turn, relates to the ease of redispersion. It was found that the flocs obtained at the lower pH value will require about 10% of the energy of that required by the high pH flocs for redispersion.

The flocculated product was treated with a dispersant mixture designated "SAP" in order to achieve a fluid, dispersed slurry. SAP is composed of 30% sodium hexametaphosphate, 45% soda ash and 25% C211 sodium acrylate, on dry weight basis. The redispersed slurries were screened through a 325-mesh sieve and spray dried using a laboratory spray dryer.

The following measurements were obtained on the spray dried products:

a. Particle size distribution (ESD) by Micromeritics Sedigraph 5100 b. pH of a 10% solids slurry c. Brookfield viscosity of a 68% solids slurry (#1 spindle @ 20 RPM)

The data are presented in Table I.

TABLE 1

Separation of Slimed Kaolin Using Organic Polymer

| | Control Low pH | +C-211 .25# | +SHMP 0.75# | +MS .25# | SHMP .25# | C211 .1# |
|---|---|---|---|---|---|---|
| Untreated Slurry | | | | | | |
| Initial pH of the slurry | 8.1 | 8.1 | 8.2 | 8.3 | 10.3 | 10.3 |
| Zeta potential, mv | −40.9 | −34.5 | −37.8 | −38.8 | −38.7 | −38.3 |
| Soluble Calcium Conc. (ppm) | 8.4 | 7.0 | 6.8 | 7.0 | 2.0 | 2.2 |
| Treated Slurry ESD Slimes | | | | | | |
| % @ 2 um | 99 | 100 | 100 | 97 | 98 | 100 |
| % @ 0.18 um | 35 | 35 | 42 | 23 | 33 | 24 |
| ESD Flocs | | | | | | |
| % @ 2 um | 95 | 94 | 95 | 95 | 94 | 93 |
| % @ 0.18 um | 11 | 8 | 9 | 12 | 9 | 8 |
| % floc recovered | 96.5 | 85.5 | 92.5 | 90.6 | 89.8 | 70.9 |
| B' field visc. (#2/20) | 203 | 250 | 221 | 250 | 440 | 864 |

The data show that in all low pH tests the viscosity of the final products were significantly lower than products prepared using a similar process but with a pH above 10 at the onset. The data also show that the selectivity of the process to separate fine from coarse particles comparing similar chemical reagents at the two pH regions shows poor results when the pH is above 10.

EXAMPLE 2

Tests similar to those performed above were completed with a non floated #1 kaolin slurry having nominally 88–92% <2 um PSD. This feed slurry had a solids content of 22.1% and a pH value of 8.3. The dispersant used to prepare the slurry was hydrosol.

The feed slurry was the control to which no reagents or dispersants were added. The following reagent and dispersant were added to portions of the feed slurry and stirring continued for 3 minutes:

1. Calcium Chloride at 2#/ton of clay and sodium polyacrylate, C-211, at 0.25#/ton of clay.

2. Calcium Chloride at 2#/ton of clay and sodium hexametaphosphate at 0.50#/ton of clay.

At the end of 3 minutes each sample, including the control, was treated with 0.3 dry #/ton of clay (in the form of a 0.025% solution) of the flocculating polymer, SHARPFLOC flocculating polymer 9950. The stirring was stopped and the slurries settled at a rate of 60 seconds/inch-depth. The nonflocculated supernatant was decanted from the flocced mass. The flocculated mass was then treated with SAP to redisperse the flocs, screened through a 325 mesh sieve and spray dried in a laboratory spray dryer. The measurements made on these products were identical to those in previous examples. The data obtained is shown in Table II.

TABLE II

Separation of Slimed Kaolin Using Organic Polymer

|  | No Additives | +CaC12+C-211 | +CaC12+SHMP |
|---|---|---|---|
| Initial Slurry pH | 7.9 | 7.5 | 7.5 |
| Zeta Potential | −39.0 | −37.0 | −38.6 |
| Soluble Calcium Level (ppm) | 2.9 | 21.2 | 20.8 |
| Treated Slurry ESD Slimes |  |  |  |
| % @ 2 um | 99 | 98 | 99 |
| % @ 0.30 um | 62 | 32 | 54 |
| ESD Flocs |  |  |  |
| % @ 2 um | 78 | 86 | 86 |
| % @ 0.30 um | 15 | 21 | 21 |
| % floc recovered | 57.6 | 89.7 | 85.9 |
| B' field visc. (#2/20) | 288 | 222 | 215 |

The results shown in Table II again demonstrate a process with high selectivity and efficient control characteristics for the segregating of kaolin particles in an aqueous slurry. The data from the test with no additives shows a reduction in particle size finer than 2 micron from the nominal 90% finer than 2 microns (feed) to 78% finer than 2 microns for the underflow product versus the results with additives of 86%. This represents a 4% versus 12% difference which is economically unfavorable in an industrial application. Additionally, the yield to the underflow product was less than 60% in the test without additives versus greater than 85% in the process of the invention.

EXAMPLE 3

This example illustrates the effect of dispersant in controlling the removal of colloidal fines from a kaolin crude and its effect on the rheology of the product. This example illustrates the application of the invention to a coarse feed fraction of kaolin which has a classical booklet morphology.

A coarse white based crude slurry that was beneficiated by the ULTRAFLOTATION process was treated with increasing amounts of C-211 sodium polyacrylate. It may be noted that the ULTRAFLOTATION product slurry has a significant concentration of calcium ions as a result of the use of a calcite carrier used in the flotation process. In accordance with the invention, 0.3 lb/ton of SHARPFLOC™ flocculating polymer 9950 polymer at a concentration of 0.025% was added to this slurry (at 20% solids) under mild agitation. Flocs began to appear immediately. As soon as agitation was stopped the flocs began to settle very rapidly. The flocs were settled at a rate of 3 inches/minute. The floc phase (gelatinous phase) constituted about 30% of the volume of the slurry.

Each dispersed slurry was decanted to separate it from the flocced layer. The flocced phase was separated and re-dispersed with 5 lb/ton/ of sodium metasilicate using a drill press laboratory blunger. This slurry was then flocced, using alum and sulfuric acid in conventional manner and filtered in a Buchner funnel. The filter cake was washed with equal volume of water and a small amount of the cake was dried in a microwave oven. The dried sample was pulverized and the PSD was analyzed using the Sedigraph 5100 analyzer. The filter cake was re-dispersed using a mixture of soda ash, C211 and sodium hexametaphosphate (SAP) and spray dried. Rheological testings were subsequently made on the pigment.

Table 3 gives the PSD of the dispersed phase and the feed. It can be seen that the greater the amount of C-211 dispersant in the system, the lower the recovery of the coarser phase (1.a), more of the fines were removed. At a dosage of 1.0 lb/ton of C-211 no flocculation was observed. It may be noted that by using 0.1 lb/ton of the C-211 in the system the colloid content (% smaller than 0.3 microns) of the product changed from 21% to 18%. Also noted was that there was no significant difference in the brightness or the iron and TiO2 contents of the feed and the product.

As expected the Hercules (high shear) viscosity became poorer as increasing amount of fines were removed, while the Brookfield viscosity was less than 500 cps at 70% solids even when significant amount of fines were removed as in the example where 0.5 lb/ton of C-211 was used. Relatively low Brookfield viscosity (less than 500 cps at 70% solids using Number 2 Spindle @ 20 rpm) is an indication that the pigment slurry is useful for coating applications.

TABLE III

Effect of C-211 in Removal of Fines and Pigment Properties

|  | FEED* | TEST 1 | TEST 2 | TEST 3 | TEST 4 |
|---|---|---|---|---|---|
| #T C-211 | 0 | 0 | 0.1 | 0.5 | 1.0 |
| YIELD | — | 95.4% | 90.6% | 49.3% | NO FLOCS |
| PSD-2u | 73 | 73 | 71 | 54 |  |
| −1u | 57 | 57, | 54 | 33 |  |
| 0.5u | 37 | 36 | 33 | 17 |  |
| 0.3u | 21 | 20 | 18 | 10 |  |

EXAMPLE 4

This example is a comparison of the efficiency of a high speed Alfa Laval disc-nozzle centrifuge operating at nominally 5000 "g" as compared to the process of the invention in the production of a deslimed kaolin pigment.

A coarse white clay fractionated to nominally a #1 clay prior to desliming using an Alfa Laval was sampled and was used to compare the commercial mechanical process and the invention. The product from the commercial Alfa Laval was sampled simultaneously with the feed.

The Alfa Laval feed sample was treated with 0.2 #/ton C211 and 2 #/ton calcium chloride. The procedure used in Example 3 was followed.

Table 4 illustrates that the fraction made by the commercial Alfa Laval can be simulated by the chemical process of this invention. The two deslimed products were subsequently processed (flocculated with 8 #/ton alum and sulfuric acid to 2.5 pH, 10 #/ton sodium dithionite bleach, filtered, washed and redispersed with 5.5 #/ton soda ash/ SHMP). Testing showed that there was no significant differences in the particle size and quality of the resulting products.

TABLE IV

COMPARISON BETWEEN CHEMICAL AND MECHANICAL DESLIMING

|  | FEED | 0.3 lb/ton of SF 9950 (Chemical) | Alfa Laval Mechanical |
|---|---|---|---|
|  | Wt. % finer than | | |
| PSD - 2 u | 89 | 89 | 89 |
| PSD - 1 u | 73 | 70 | 71 |
| PSD 0.5 u | 45 | 41 | 42 |
| PSD 0.3 u | 24 | 22 | 21 |
| Properties of Pigment Products | | Chemical Fractionation | Alfa Laval (Mechanical) |
| GEB, % | | 87.9 | 87.9 |
| Surface Area (m2/g) | | 12.53 | 12.49 |
| Black Glass Scatter, 577 nm @ 60% solids | | 0.084 | 0.078 |
| Rheology @ 70% solids. Brookfield No. 2 spindle at 20 rpm); Hercules Viscosity A bob, rpm/dyne | | 200 435/16 | 160 488/16 |

Note that the similarity in surface areas between the products reflect the similarity in particle size distribution.

EXAMPLE 5

The accompanying figure contains particle size distribution curves for a representative feed clay as well as deslimed product and the slimed fraction. In conventional manner the distributions are all expressed on a weight basis.

To more fully appreciate the potential extent of slime removal when evaluated on the basis of the number of particles involved, calculations were performed to estimate the number of particles involved.

The feed particle size (78.2%–2 micron and 24.7%–0.3 microns) has $3.2 \times 10^{12}$ particles per gram of kaolin as calculated using a derivative of Stokes Law.

Stokes equation:

N=liquid viscosity in poise g=gravity acceleration constant h=sedimentation height t=time in seconds D=diameter in cm of the particle Using the above equation, the mass fraction in a interval can be calculated based on the number of equivalent spheres. During a particle size test 250 intervals are measured and the cumulative mass fraction determined.

This calculation does not consider the fraction finer than 0.3 microns due to the difficulty of accurately measuring particle size by sedimentation procedures in the colloidal size range. Note the feed referenced in the graph has almost 25% of the particles in this very fine particle size.

Using this technique, it was calculated that the deslimed product (74.5%–2 and 18.4%–0.3 microns) contains $2.8 \times 10^{12}$ particles per gram and that the slime product (98.4%–2 and 61.2%–0.3 microns) contains $4.0 \times 10^{12}$ particles per gram.

We claim:

1. A kaolin pigment useful for providing the combination of opacification and gloss when coated on paper, said pigment comprising a mass of kaolin crystals having an average particle size in the range of 0.5 to 5 microns and a narrow particle size distribution such that the ratio of the weight of the fraction of particles finer than 2 microns divided by the weight of the fraction finer than 0.3 microns is greater than 4.0, said pigment containing an anionic polymeric flocculating agent in amount ranging from 50 to 500 ppm and 0.025% to 0.1% by weight of calcium as expressed as calcium oxide, based on the dry weight of the pigment.

2. The pigment of claim 1 wherein said ratio is greater than 4.5.

3. Paper coated with the kaolin pigment of claim 1.

4. A process for manufacturing a purified kaolin product from a previously beneficiated/flotated dispersed pulp of kaolin clay comprising:

(a) adding at least one anionic dispersant to the previously beneficiated/flotated dispersed pulp of kaolin clay and adjusting the pH to a value that is above 7 and below 10, and incorporating a water soluble source of polyvalent cations unless said pulp of kaolin already contains polyvalent cations, the amount of polyvalent cations being at least sufficient to provide of concentration of 5 ppm in the aqueous phase of said pulp but being insufficient to cause said pulp to flocculate, said anionic dispersant being selected from the group consisting of sodium silicate, alum silica hydrosol, sodium condensed phosphate, sodium polyacrylate, sodium carbonate, mixtures thereof and mixtures with sodium hydroxide;

(b) incorporating a sufficient quantity of an anionic polymeric flocculating agent into the anionically dispersed pulp of kaolin clay from step (a) to cause the pulp to flocculate rapidly to form a lower coherent gelatinous layer which is a concentrate of coarser purified kaolin particles and an upper dilute dispersed suspended layer which is a concentrate of kaolin particles finer than 0.3 microns; said lower layer being sufficiently dense that it rapidly settles below said dispersed suspended layer;

(c) removing said upper layer from said lower layer, recovering at least said lower layer, and (d) adding an anionic salt dispersant to said lower layer to provide a fluid slip of said coarser fraction of kaolin particles in said pulp.

5. The process of claim 4 wherein at least 60 percent by weight of the kaolin particles larger than 0.3 microns in step (a) is recovered in said lower layer in step (c).

6. The process of claim 4 wherein said polymer in step (b) has a molecular weight of about 10 million and is copolymer of acrylic acid and acrylamide.

7. The process of claim 6 wherein the ratio of acrylic acid to acrylamide in said polymer is about 80 to 20.

8. The process of claim 4 wherein said source of polyvalent cations is a calcium salt.

9. The process of claim 8 wherein said calcium salt is calcium chloride.

10. The process of claim 4 wherein the dispersed pulp has a zeta potential after addition of anionic dispersant in step (a) of –30 to –45 millivolts.

11. The process of claim 4 wherein ozone is added to said kaolin after flotation and before step (a).

* * * * *